US007747997B1

(12) United States Patent
Rao

(10) Patent No.: US 7,747,997 B1
(45) Date of Patent: Jun. 29, 2010

(54) FIRMWARE UPDATE IN ELECTRONIC DEVICES EMPLOYING SIM CARD FOR SAVING METADATA INFORMATION

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1748 days.

(21) Appl. No.: 10/706,219

(22) Filed: Nov. 12, 2003

Related U.S. Application Data

(63) Continuation of application No. 10/695,312, filed on Oct. 28, 2003, now abandoned.

(60) Provisional application No. 60/425,903, filed on Nov. 13, 2002.

(51) Int. Cl.
*G06F 9/445* (2006.01)
(52) U.S. Cl. .................. 717/170; 717/169; 717/171
(58) Field of Classification Search ............... None
See application file for complete search history.

(56) References Cited

U.S. PATENT DOCUMENTS

| 5,261,055 | A | | 11/1993 | Moran et al. ................ 395/275 |
| 5,418,837 | A | * | 5/1995 | Johansson et al. ........... 455/558 |
| 5,442,771 | A | | 8/1995 | Filepp et al. ................ 395/650 |
| 5,479,637 | A | | 12/1995 | Lisimaque et al. .......... 395/430 |
| 5,579,522 | A | | 11/1996 | Christeson et al. .......... 395/652 |
| 5,596,738 | A | | 1/1997 | Pope ........................ 395/430 |
| 5,598,534 | A | | 1/1997 | Haas ..................... 395/200.09 |
| 5,608,910 | A | | 3/1997 | Shimakura ................. 395/670 |
| 5,623,604 | A | | 4/1997 | Russell et al. ............ 395/200.1 |
| 5,666,293 | A | | 9/1997 | Metz et al. ............... 395/200.5 |
| 5,752,039 | A | | 5/1998 | Tanimura ................... 395/712 |
| 5,778,440 | A | | 7/1998 | Yiu et al. ................... 711/154 |
| 5,790,974 | A | | 8/1998 | Tognazzini ................. 701/204 |
| 5,878,256 | A | | 3/1999 | Bealkowski et al. ........ 395/652 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Chuck O Kendall

(57) ABSTRACT

A system and method for saving metadata information related to firmware/software updates in a SIM card is disclosed. An electronic device with an update agent may employ an update package reference storage area in a SIM card to save metadata information related to a downloaded update package. The update agent may access the stored metadata information during power up or reboot in order to access and/or process the downloaded update package. The SIM card, or in various embodiments of the present invention, a smart card, a removable memory card, or a removable memory module, may be employed by the electronic device to save information about downloaded files that are stored in a file system in the electronic device. Such information may subsequently be accessed by the update agent when the file system is not available. This may occur, for example, during power-up or reboot, when the update package needs to be accessed to perform a firmware/software update.

29 Claims, 3 Drawing Sheets

U.S. PATENT DOCUMENTS

| | | | |
|---|---|---|---|
| 5,960,445 A | 9/1999 | Tamori et al. | 707/203 |
| 6,009,497 A | 12/1999 | Wells et al. | 711/103 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,400,965 B1* | 6/2002 | Phillips et al. | 455/558 |
| 6,438,585 B2 | 8/2002 | Mousseau et al. | 709/206 |
| 6,556,842 B1* | 4/2003 | Ericsson | 455/558 |
| 6,640,334 B1* | 10/2003 | Rasmussen | 717/171 |
| 6,754,895 B1* | 6/2004 | Bartel et al. | 717/171 |
| 6,832,373 B2* | 12/2004 | O'Neill | 717/171 |
| 7,055,148 B2* | 5/2006 | Marsh et al. | 717/172 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0217358 A1* | 11/2003 | Thurston et al. | 717/174 |
| 2004/0194081 A1* | 9/2004 | Qumei et al. | 717/173 |
| 2007/0169099 A1* | 7/2007 | Rao et al. | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

FIRMWARE UPDATE IN ELECTRONIC DEVICES EMPLOYING SIM CARD FOR SAVING METADATA INFORMATION

RELATED APPLICATIONS

This application is a continuation of U.S. patent application Ser. No. 10/695,312, entitled "Firmware Update in Electronic Devices Employing SIM Card For Saving Metadata Information", filed Oct. 28, 2003, now abandoned which makes reference to, claims priority to, and claims the benefit of U.S. Provisional Patent Application 60/425,903, entitled "Firmware Update In Electronic Devices Employing SIM Card For Saving Metadata Information", filed Nov. 13, 2002, the complete subject matter of each of which is hereby incorporated herein by reference, in its entirety.

In addition, this application makes reference to U.S. Provisional Patent Application Ser. No. 60/249,606, filed Nov. 17, 2000, PCT Application Ser. No. PCT/US01/44034, entitled "System And Method For Updating And Distributing Information", filed Nov. 17, 2001, U.S. patent application Ser. No. 10/311,462, entitled "System And Method For Updating And Distributing Information", filed May 13, 2003, U.S. Provisional Patent Application Ser. No. 60/386,199, entitled "Communication Network Capable Of Determining SIM Card Changes In Electronic Devices", filed Apr. 19, 2002, and U.S. Provisional Patent Application Ser. No. 60/425,901, entitled "Firmware Update In Electronic Devices Employing Update Agent In SIM Card", filed Nov. 13, 2002, the complete subject matter of each of which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. Electronic devices, such as GSM phones, often contain a SIM card reader that is employed to read information on SIM cards that are inserted by end users. At least one function of SIM cards is to provide a personal identity for a user regardless of the phone actually in use. Quite often, SIM cards are used to specify the identification of the end user such that any device into which the SIM card is inserted assumes the identity provided by the SIM card. The firmware and application software on such electronic devices often employ information contained in a SIM card to access, over the telecommunications network, services offered by service providers.

If an electronic device such as, for example, a mobile handset, contains operating system and applications software that is updateable, support for the download of one or more update packages comprising information used for updating such software is necessary. It is often difficult, however, to communicate information regarding the location of such update packages to a firmware component, such as an update agent, that needs to access and apply such updates. Update agents that operate at a level below the operating system, closer to the device hardware, may not have access to file system features of the operating system. In addition, the update agents may not have access to other facilities that would typically be available to applications supported by an underlying operating system.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in an updatable electronic device comprising a memory having at least one of firmware and software, at least one firmware component, and an interface for communicatively coupling to a user removable electronic memory device. The at least one firmware component may function to update at least a portion of at least one of firmware and software, and the user removable electronic memory device may comprise information related to the updating of the at least a portion of the at least one of firmware and software. The at least one firmware component may comprise an update agent for updating the at least a portion of the at least one of firmware and software, and the update agent may use at least one of an update package and the information related to the updating of the at least one of firmware and software. An embodiment in accordance with the present invention may also comprise a communication interface for receiving the update package, and the communication interface may be a wireless communication interface. The update package may comprise a set of instructions for updating the at least a portion of the at least one firmware and software.

In an embodiment of the present invention, the information related to the updating of the at least one firmware and software may comprise at least one of a cyclic redundancy check (CRC), a location in a file system, a memory address, a status flag, and new firmware. The information related to the updating of the at least one firmware and software may comprise an indication of the availability of an update for the at least one of a firmware and software, an indication of the success of an update of the at least one of firmware and software, and may be used to verify or authenticate an update of the at least one of firmware and software. The user removable electronic memory device may comprise one of a subscriber identity module (SIM) card, a smart card, an integrated circuit (IC) card, a removable memory card, and a removable memory module.

Additional aspects of the present invention may be seen in a method of updating an updatable electronic device comprising a memory containing at least one of firmware and software, and a user removable electronic memory device. Such a method may comprise retrieving information from the user removable electronic memory device, and determining whether an update of the at least one of firmware and software is available using information from the user removable electronic memory device. An embodiment of the present invention may comprise performing an update of at least a portion of the at least one of firmware and software using at least information from the user removable electronic memory device, if an update of the firmware is available, and refraining from performing an update of at least a portion of the at least one of firmware and software, if an update of the firmware is not available. The user removable electronic memory device may comprise one of a subscriber identity module (SIM) card, a smart card, an integrated circuit card, a removable memory card, and a removable memory module, and the updatable electronic device may be a mobile handset.

In an embodiment in accordance with the present invention, the information from the user removable electronic memory device may comprise at least one of a signature, a location in a file system, a memory address, a status flag, and new firmware. The signature may comprise a cyclic redundancy check (CRC). The information from the user removable electronic memory device may comprise an indication of the availability of an update for the at least a portion of the at least one of a firmware and software, and may be used to verify or authenticate an update of the at least a portion of the at least one of a firmware and software. An embodiment of the present invention may also comprise receiving an update package from a server, and the update package may comprise a set of instructions for updating the at least a portion of the at least one firmware and software. In an embodiment of the present invention, the receiving may be performed using a wireless network, and the information from the user removable electronic memory device may comprise the location of at least one of the update package and the server.

An embodiment in accordance with the present invention may comprise storing status information in the user removable electronic memory device, if an update was performed, and refraining from storing status information in the user removable electronic memory device, if an update was not performed. An embodiment of the present invention may perform at least one of restarting or rebooting the updatable electronic device, and at least one of a need to restart or reboot and a type of reboot may be resident in the user removable electronic memory device. In an embodiment of the present invention, the determining may comprise verifying whether the retrieved information is at least one of appropriate and authentic, continuing the performance of an update if the verification is successful, and executing a normal startup of the updatable electronic device if the verification is not successful.

These and other advantages, aspects and novel features of the present invention, as well as details of an illustrated embodiment thereof, will be more fully understood from the following description and drawings.

DETAILED DESCRIPTION OF THE INVENTION

The present invention relates generally to the process of updating software/firmware in electronic devices and, more specifically, to the use of a Subscriber Identity Module (SIM) card or a smart card for providing storage space to store metadata information related to update packages employed in the update of firmware/software in an electronic device.

Figure 1:
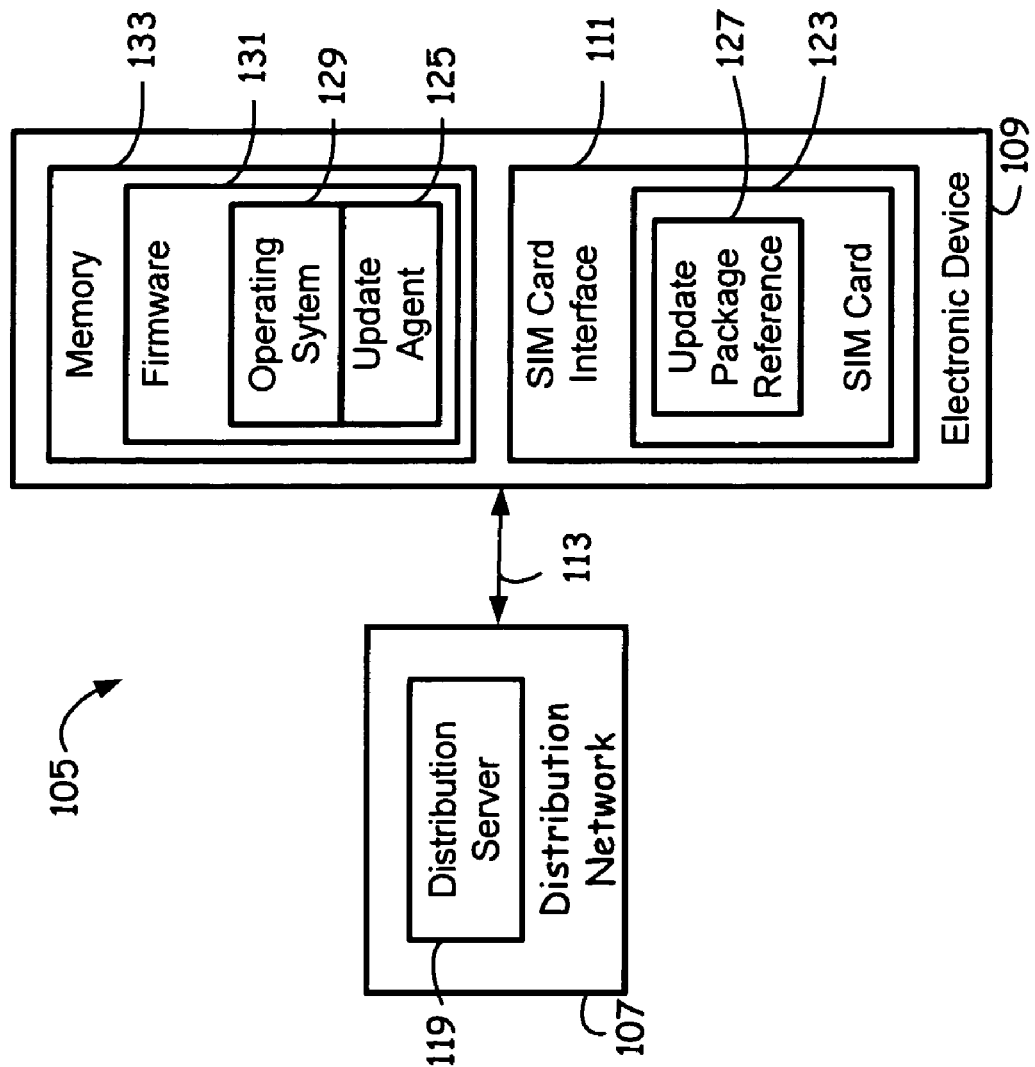
FIG. 1 is a block diagram of an updatable electronic device having memory comprising firmware/software, and a SIM card that provides access to data stored in an update package reference storage area, in accordance with an embodiment of the present invention.

FIG. 1 is a block diagram of an updatable electronic device 109 having memory 133 comprising firmware/software 131, and a SIM card 123 that provides access to data stored in an update package reference storage area 127, in accordance with an embodiment of the present invention. The portion of the memory 133 containing the firmware/software 131 of electronic device 109 is generally non-volatile memory, although memory 133 may comprise both non-volatile and volatile memory. The firmware/software 131 comprises an operating system 129 and an update agent 125. The electronic device 109 of FIG. 1 may employ the update agent 125 to update the firmware/software 131 in the electronic device 109 using information stored in SIM card 123. The electronic device 109 of FIG. 1 is communicatively coupled by communication link 113 to a distribution network 107, that provides access to update packages. The update packages may comprise information used by update agent 125 in the electronic device 109 to update the firmware/software 131 of electronic device 109. The information in such an update package may comprise things such as, for example, a set of instructions for updating a portion of the firmware/software 131. Addition details of exemplary update packages may be found in U.S. Provisional Patent Application Ser. No. 60/249,606, filed Nov. 17, 2000, PCT Application Serial No. PCT/US01/44034, entitled "System And Method For Updating And Distributing Information", filed Nov. 17, 2001, U.S. patent application Ser. No. 10/311,462, entitled "System And Method For Updating And Distributing Information", filed May 13, 2003, the complete subject matter of each of which is hereby incorporated herein by reference in its entirety. The distribution server 119 in the distribution network 107 may act not only as a repository of update packages, but also as a system that selectively dispenses the update packages to the electronic device 109. Although shown as a single electronic device 109 for reasons of clarity, the electronic device 109 of FIG. 1 is representative of a plurality of electronic devices capable of being updated by the distribution server 119.

Together, the electronic device 109 and the distribution network 107 comprise a communications network 105 capable of distributing update packages to the electronic device 109. In one embodiment of the present invention, the electronic device 109 may be, for example, a mobile handset in a wireless network.

In an embodiment of the present invention, the electronic device 109 may comprise an update agent 125, and a SIM card 123 that provides an update package reference storage area 127. The SIM card 123 interfaces to the electronic device 109 through interface 111. Although a SIM card is a specific form of user removable electronic memory device, the present invention applies equally to other forms of user removable electronic memory devices such as, for example, smart cards (sometimes referred to as "integrated circuit cards" or "IC cards"), removable memory cards, removable memory modules, and the like. Therefore, although this application refers to a SIM card, the present invention is not limited in this regard, as other forms of removable electronic memory device are contemplated and applicable. The update package reference storage area 127 of SIM card 123 may, for example, comprise a 16-byte space where metadata information, associated with an update package downloaded to the electronic device 109, is stored. The metadata information may be used during a subsequent access by the update agent 125, such a subsequent access typically occurring during a restart/reboot of the electronic device, or during a power-up event.

In an embodiment in accordance with the present invention, the update agent 125 may detect the presence of the update package reference storage area 127 in the SIM card 123, and may employ the information contained in the update package reference storage area 127 during an update of the firmware/software 131 in the memory 133 of the electronic device 109. In an embodiment of the present invention, the update package reference storage area 127 may contain metadata information related to an update package. In one embodiment of the present invention, the metadata information contained in the update package reference storage area 127 may comprise, for example, one or more signatures such as, for example, 4-byte cyclic redundancy check (CRC) values, an address in memory 133 where the update package is stored, an address of a backup section in the memory 133 of the electronic device 109 that is employed during an update process, and a 4-byte status field indicating the need to update firmware/software 131 in the electronic device 109. Other formats and data types are also contemplated for such metadata. In addition, other types of metadata information are contemplated for storage in the update package reference 127.

In an embodiment of the present invention, the update agent 125 may be invoked during a reboot or startup (power-up) of the electronic device, to determine whether an update of the firmWare/software 131 in the electronic device is available. If the update agent 125 determines from the metadata information in the update package reference storage area 127 indicates that an update of the firmware/software is available, the update agent 125 may access the update package in the memory 133 of the electronic device 109 using addresses and/or references provided in the update package reference storage area 127. The update agent 125 in an embodiment of the present invention (e.g., the electronic device 109) may access data or code stored in the SIM card 123, and may use the data as needed in the update process.

In one embodiment of the present invention, the electronic device 109 may be capable of determining when the SIM card 123 has been changed. For example, the electronic device 109 may determine if one SIM card 123 has been removed and a different SIM card 123 introduced into the SIM card interface 111 of the electronic device 109. In an embodiment in accordance with the present invention, the update agent 125 may facilitate determination of SIM card changes in the electronic device 109. The update agent 125 may also facilitate the reporting of such changes to the distribution network 107. In addition, the determination of changes to information contained in the SIM card 123 may be detected and acted upon by the electronic device 109.

In an embodiment of the present invention, restarting/rebooting of the electronic device 109 may be avoided for some types of update packages. Information indicating whether or not a restart/reboot of the electronic device 109 is to be performed may be communicated to the electronic device 109 when an update package is delivered to the electronic device 109 by the distribution server 119. An indication of a request to reboot electronic device 109 during an update may be communicated to the electronic device 109, and may be stored as a flag in the metadata information stored in the update package reference storage area 127. In a related embodiment, the type of reboot to be performed (e.g., a "soft" reboot or a "hard" reboot) may be specified if there is a need to reboot the electronic device following the download of the update package and an update of firmware/software 131. Thus, "reboot needed" information may be communicated to an electronic device such as, for example, a wireless mobile handset, along with an update package. An indication of a request for a reboot, along with information specifying the kind of reboot—e.g., "soft" or "hard", may be stored in the update package reference storage area 127.

Figure 2:
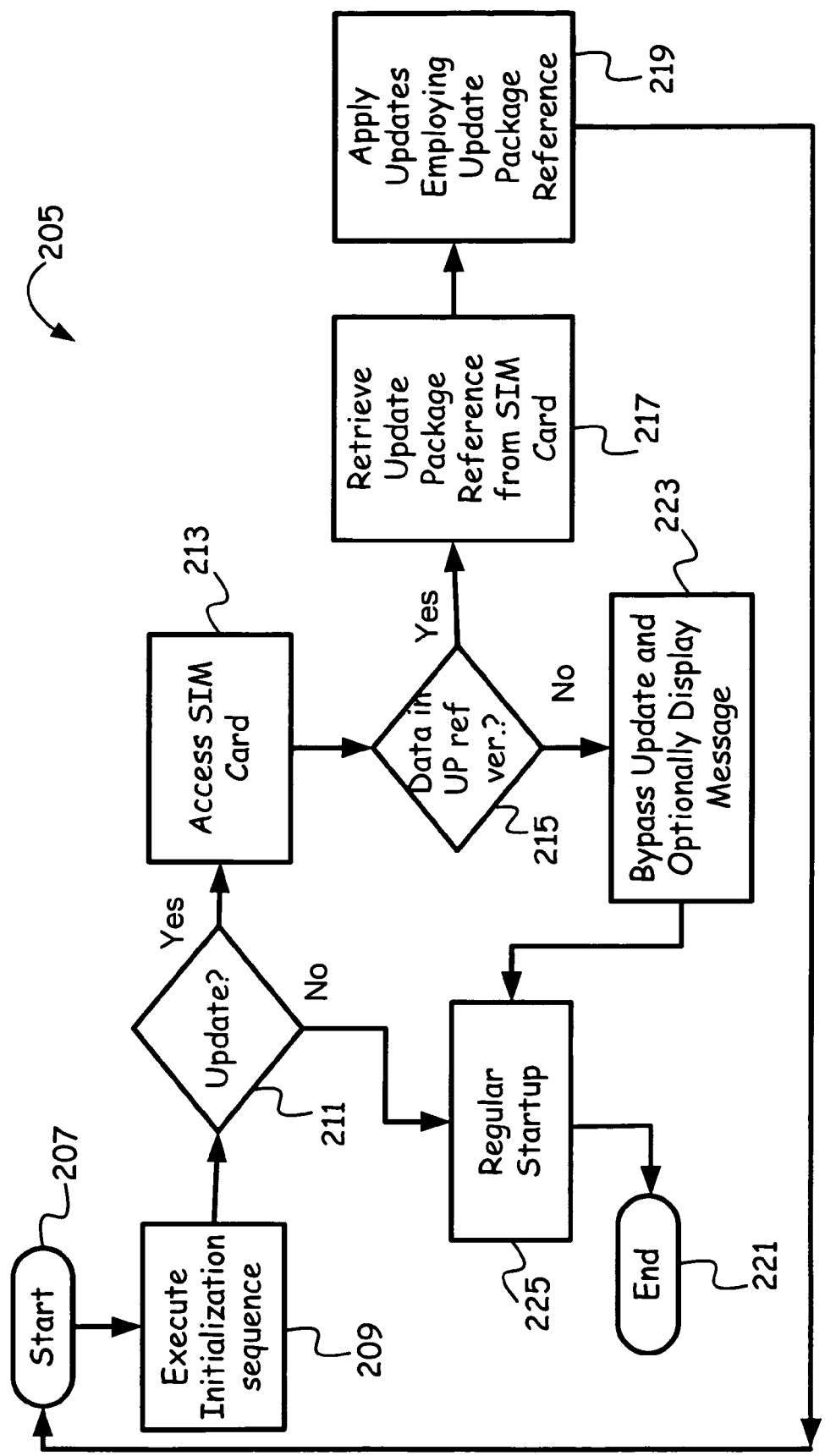
FIG. 2 is a flow chart illustrating an exemplary method of operating an electronic device, such as the electronic device of FIG. 1, when it accesses the update package reference storage area in a SIM card as the electronic device is powered up or restarted, in accordance with an embodiment of the present invention.

FIG. 2 is a flow chart illustrating an exemplary method of operating an electronic device, such as the electronic device 109 of FIG. 1, when it accesses the update package reference storage area in a SIM card as the electronic device is powered up or restarted, in accordance with an embodiment of the present invention. The following description of the method of FIG. 2 makes reference to the illustration shown in FIG. 1. At the start of the process (block 207), an electronic device, such as the electronic device 109 of FIG. 1, is powered-up or restarted (rebooted). The electronic device then executes an initialization sequence typically executed as part of an initial bootstrap operation (block 209). Next, an update agent resident in the electronic device determines whether an update of the firmware/software (e.g., firmware/software 131) of the electronic device is available (block 211). In one embodiment of the present invention, the update agent may access an update package reference storage area, such as update package storage area 127 in the SIM card 123 of FIG. 1, to retrieve a status flag. When set, such a status flag may indicate a request to update firmware/software, employing an update package stored in a file system in the memory (e.g., memory 133) of the electronic device. The location where the update package is stored in the file system of the electronic device may also be provided in the update package reference storage area of the SIM card.

If it is determined (block 211) that there is no need to update the firmware/software of the electronic device, then the regular or normal startup of the electronic device is activated (block 225), and the illustrated process ends (block 221).

If it is determined (block 211) that an update of firmware/software is indicated, then the update package storage area of the SIM card may be accessed by an update agent, such as the update agent 125 of FIG. 1, to retrieve metadata information used in performing the update (block 213). An attempt may then be made to verify whether the metadata information in the update package reference storage area of the SIM card is appropriate and relevant (block 215). If it is determined that the metadata information in the update package reference storage area of the SIM card is not authentic, or is inappropriate, the update process is bypassed, and a message may be displayed to a user to indicate that the update package reference storage area contains inappropriate data (block 223). The regular or normal startup of the electronic device may then be activated (block 225), and the illustrated process ends (block 221).

If it is determined that the metadata information provided in the update package reference storage area of the SIM card is authentic and appropriate (block 215), then the update agent may retrieve metadata information from the update package reference storage area of the SIM card (block 217), access the update package and associated information using metadata information retrieved from the update package reference storage area, and prepare for the update processing. The update agent may then apply one or more update packages to the firmware/software of the electronic device, using metadata information from the update package reference storage area (block 219). In addition, one or more flags may be set (or reset) to indicate success or failure of the update process. Such flags may be located in the non-volatile memory of the electronic device, or in the SIM card, and may be accessed as processing continues (block 207) after a restart/reboot or power cycle.

In an embodiment of the present invention, a newer update agent may be retrieved from the SIM card, and may replace the existing update agent (block 217).

Figure 3:
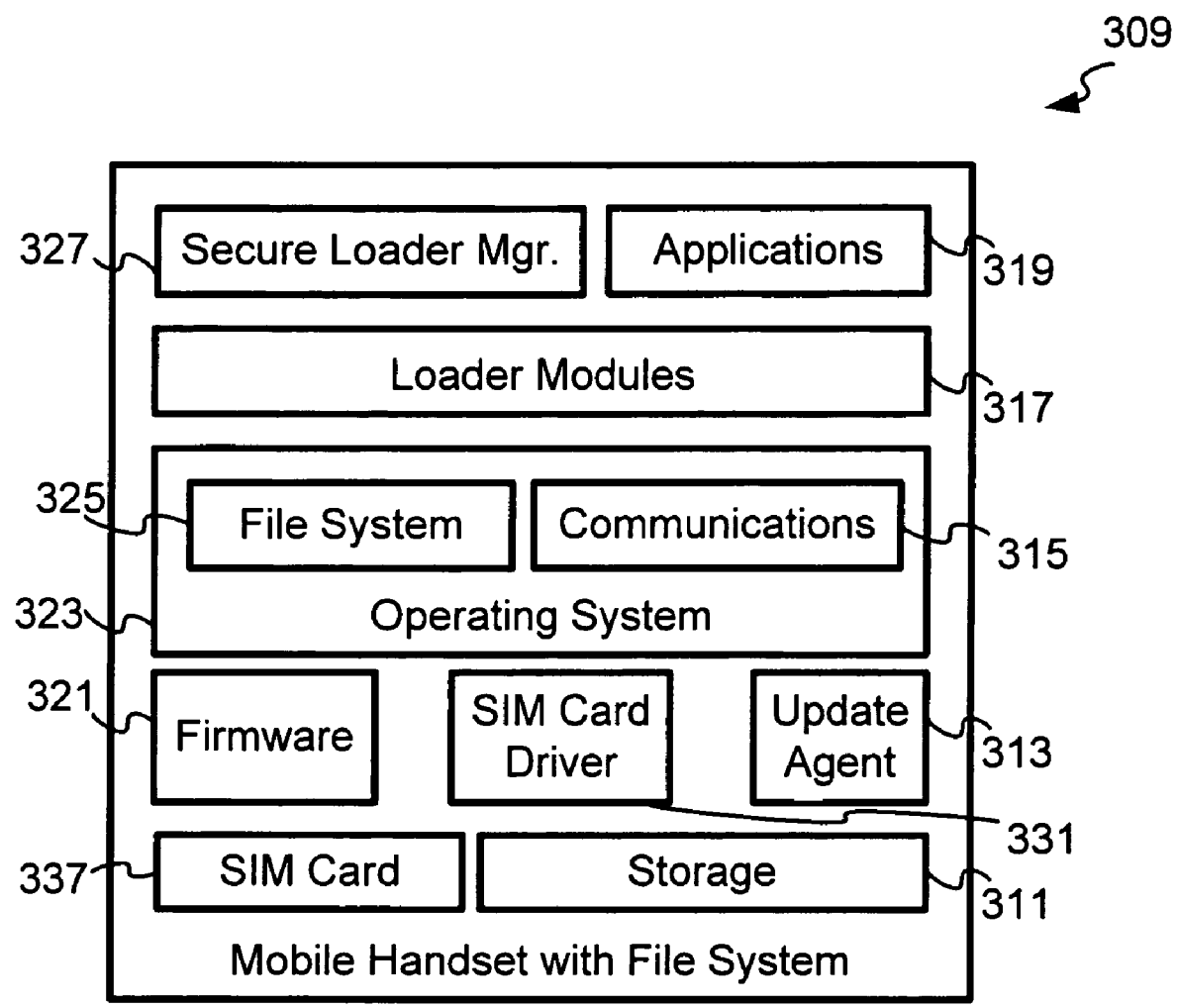
FIG. 3 is a schematic diagram of an exemplary embodiment of a mobile handset 309 with a file system, in accordance with an embodiment of the present invention.

FIG. 3 is a schematic diagram of an exemplary embodiment of a mobile handset 309 with a file system, in accordance with an embodiment of the present invention. The exemplary mobile handset 309 of FIG. 3 may correspond to the electronic device 109 of FIG. 1. The mobile handset 309 may download an update package using communications means 315, store the downloaded updated package into a file system 325 provided by operating system 323, and populate an update package reference storage area (not shown) in a SIM card 337. During the download of the update package, the mobile handset 309 may employ services provided by a SIM card driver 331. An update agent 313 in the mobile handset 309 may also employ the services provided by the SIM card driver 331 to access the update package reference storage area in SIM card 337 before or during an update process, to retrieve metadata information related to the downloaded update package. The SIM card 337 may provide storage for storing and retrieving metadata information related to the update of mobile handset 309. Such metadata information may be stored by a secure loader manager 327 that is responsible for managing downloads of update packages over communications means 315. In an embodiment of the present invention, the metadata information stored in SIM card 337 may comprise addresses of locations in the file system where update packages are stored, and where backup space for processing is provided. The metadata information may later be accessed by the update agent 313 during power-up or restart/reboot of the mobile handset 309.

In an embodiment of the present invention, an initial boot sequence may be executed on a power-up or restart/reboot, before the update agent 313 or the firmware 321 is activated. Specifically, the update agent 313 may be activated immediately after the initial boot sequence and before the firmware 321.

In one embodiment of the present invention, the update agent 313 may determine a need to update the firmware/software by accessing metadata information stored in the update package reference storage area in a SIM card, such as SIM card 337 of FIG. 3. In a related embodiment, the update agent 313 may determine a need to update the firmware/software using information stored in the storage 311, or in the firmware 321, without accessing the SIM card 337.

In one embodiment of the present invention, the update agent 313 may determine that an update of firmware/software is to be performed, and may access the SIM card 337 via the SIM card driver 331, to retrieve metadata information in an update package reference (not shown) in the SIM card 337. The metadata information may comprise authentication information such as, for example, one or more signatures (e.g., CRC values) used to verify and/or authenticate portions of the update package, or the updated firmware/software. The metadata information may also comprise, for example, the location of one or more update packages in storage 331 or file system 325, and addresses of backup areas or sections in storage 311. This metadata information may be employed during the processing of update packages before an update, or during an update process, and may also comprise status flags, Universal Resources Locators (URLs) in a distribution network such as distribution network 107 of FIG. 1, other update-related parameters, and the like.

In an embodiment of the present invention, an electronic device such as, for example, the electronic device 309 of FIG. 3, with an update agent such as, for example, update agent 313, may employ an update package reference stored in a SIM card, to save metadata information related to a downloaded update package. The update agent may access the saved metadata information during power up or restart/reboot in order to access and/or process the downloaded update package. In an embodiment in accordance with the present invention, a SIM card such as, for example, SIM card 337 of FIG. 3 may be employed by an electronic device to save information about downloaded files that are stored in a file system of the electronic device such as, for example, file system 325 of FIG. 3. Such information may subsequently be accessed by the update agent when the functionality of the file system is not available. This may occur, for example, during power-up or restart/reboot, when the update package may be accessed to perform a firmware/software update.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An updatable electronic device comprising:
   a memory comprising at least one of firmware and software;
   at least one firmware component, functioning to update at least a portion of at least one of firmware and software using update information stored in the memory;
   an interface for communicatively coupling to a removable electronic memory device; and
   wherein the removable electronic memory device comprises metadata information associated with the stored update information for updating of the at least a portion of the at least one of firmware and software.

2. The device of claim 1 wherein the at least one firmware component comprises:
   an update agent for updating the at least a portion of the at least one of firmware and software, the update agent using the update information and the information related to the updating of the at least one of firmware and software.

3. The device of claim 1 further comprising:
   a communication interface for receiving the update information.

4. The device of claim 3 wherein the communication interface is a wireless communication interface.

5. The device of claim 2 wherein the update information comprises an update package containing a set of instructions executable by the update agent for updating the at least a portion of the at least one firmware and software.

6. The device of claim 1 wherein the metadata information associated with the stored update information for updating of the at least one firmware and software comprises at least one of a cyclic redundancy check (CRC), a location in a file system, a memory address, a status flag, and new firmware.

7. The device of claim 1 wherein the metadata information associated with the stored update information for updating of the at least one firmware and software comprises an indication of the availability in the memory of update information for the at least one of a firmware and software.

8. The device of claim 1 wherein the metadata information associated with the stored update information for updating of the at least one firmware and software comprises an indication of the success of an update of the at least one of firmware and software.

9. The device of claim 1 wherein the metadata information associated with the stored update information for updating of the at least one firmware and software is used to verify or authenticate an update of the at least one of firmware and software.

10. The device of claim 1 wherein the removable electronic memory device comprises one of a subscriber identity module (SIM) card, a smart card, an integrated circuit (IC) card, a removable memory card, and a removable memory module.

11. A method of updating an updatable electronic device comprising a memory containing at least one of firmware and software, and a user removable electronic memory device, the method comprising:
   retrieving metadata information from the user removable electronic memory device;
   determining whether update information for updating the at least one of firmware and software is available in the memory, using the metadata information from the user removable electronic memory device;
   performing an update of at least a portion of the at least one of firmware and software using at least a portion of the metadata information from the user removable electronic memory device, if update information for updating the at least one of firmware and software is available in the memory; and
   refraining from performing an update of at least a portion of the at least one of firmware and software, if update information for updating the at least one of firmware and software is not available in the memory.

12. The method of claim 11 wherein the user removable electronic memory device comprises one of a subscriber identity module (SIM) card, a smart card, an integrated circuit card, a removable memory card, and a removable memory module.

13. The method of claim 11 wherein the updatable electronic device is a mobile handset.

14. The method of claim 11 wherein the metadata information from the user removable electronic memory device comprises at least one of a signature, a location in a file system, a memory address, a status flag, and new firmware.

15. The method of claim 14 wherein the signature comprises a cyclic redundancy check (CRC).

16. The method of claim 11 wherein the metadata information from the user removable electronic memory device comprises an indication of the availability in the memory of update information for updating the at least a portion of the at least one of a firmware and software.

17. The method of claim 11 wherein the metadata information from the user removable electronic memory device is used to verify or authenticate an update of the at least a portion of the at least one of a firmware and software.

18. The method of claim 11 further comprising:
   receiving update information comprising an update package from a server; and
   the update package comprising a set of instructions for updating the at least a portion of the at least one firmware and software.

19. The method of claim 18 wherein:
   the receiving is performed using a wireless network; and
   the metadata information from the user removable electronic memory device comprises the location of at least one of the update package and the server.

20. The method of claim 11 further comprising:
   storing status information in the user removable electronic memory device, if an update was performed; and
   refraining from storing status information in the user removable electronic memory device, if an update was not performed.

21. The method of claim 11 further comprising:
   performing at least one of restarting or rebooting the updatable electronic device.

22. The method of claim 21 wherein at least one of a need to restart or reboot and a type of reboot is resident in the user removable electronic memory device.

23. The method of claim 11 wherein the determining comprises:
   verifying whether the retrieved metadata information is at least one of appropriate and authentic;
   continuing the performance of an update, if the verification is successful; and
   executing a normal startup of the updatable electronic device, if the verification is not successful.

24. The updatable electronic device of claim 1, wherein the update information comprises at least one update package.

25. The updatable electronic device of claim 1, wherein the metadata information related to the stored update information for updating of the at least one of firmware and software comprises information identifying the source of the update information received by the electronic device.

26. The updatable electronic device of claim 25, wherein the information identifying the source of the update information comprises a universal resource locator (URL).

27. The method of claim 11, wherein the update information comprises at least one update package.

28. The method of claim 11, wherein the determining comprises:
   downloading the update information from a remote server identified in the user removable electronic memory device.

29. The method of claim 19, wherein the location of at least one of the update package and the server comprises a universal resource locator (URL).

* * * * *